UNITED STATES PATENT OFFICE.

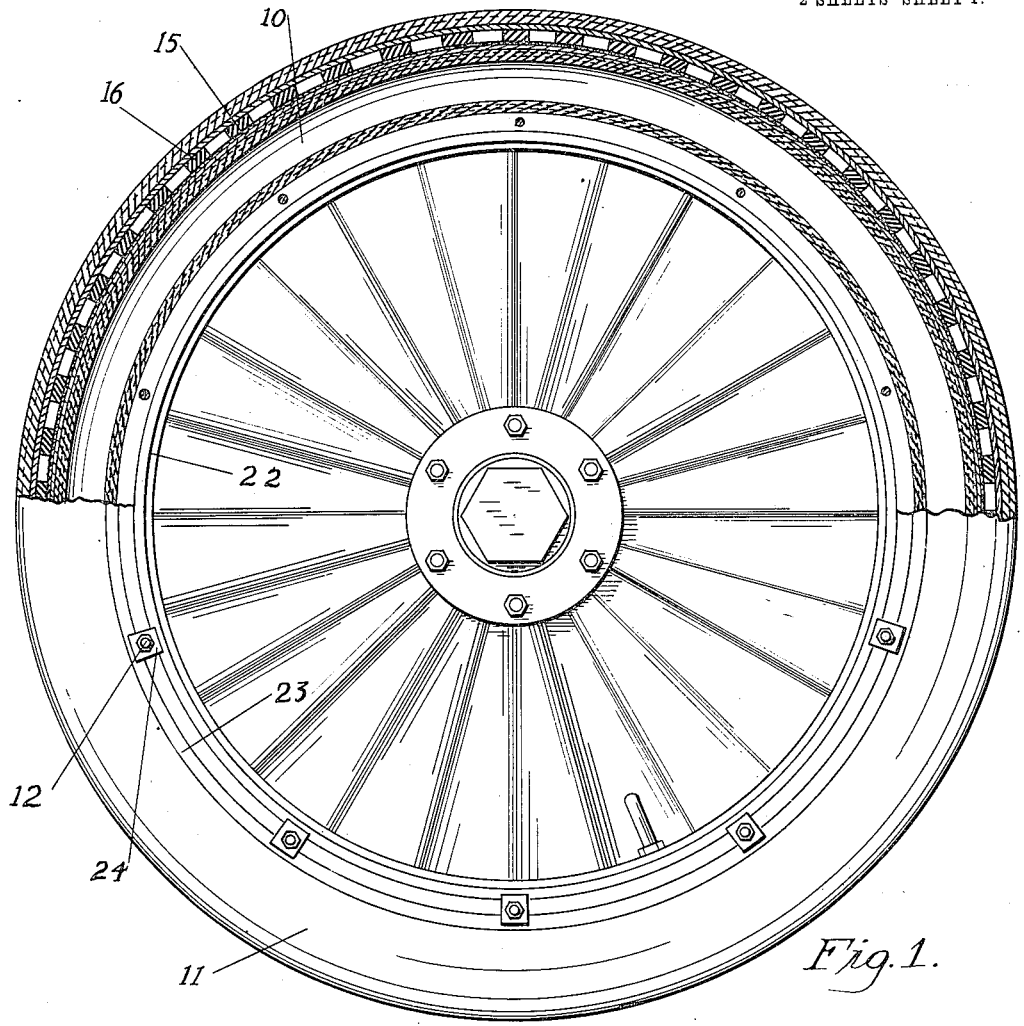
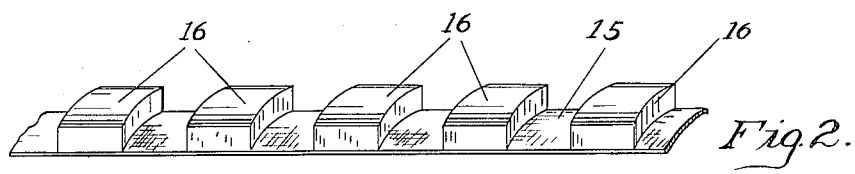

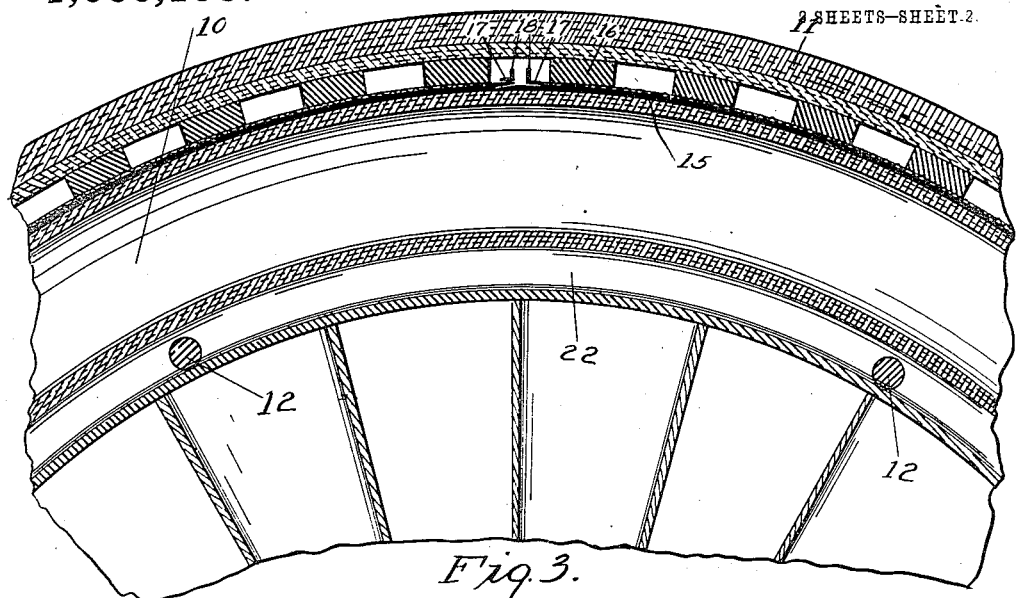
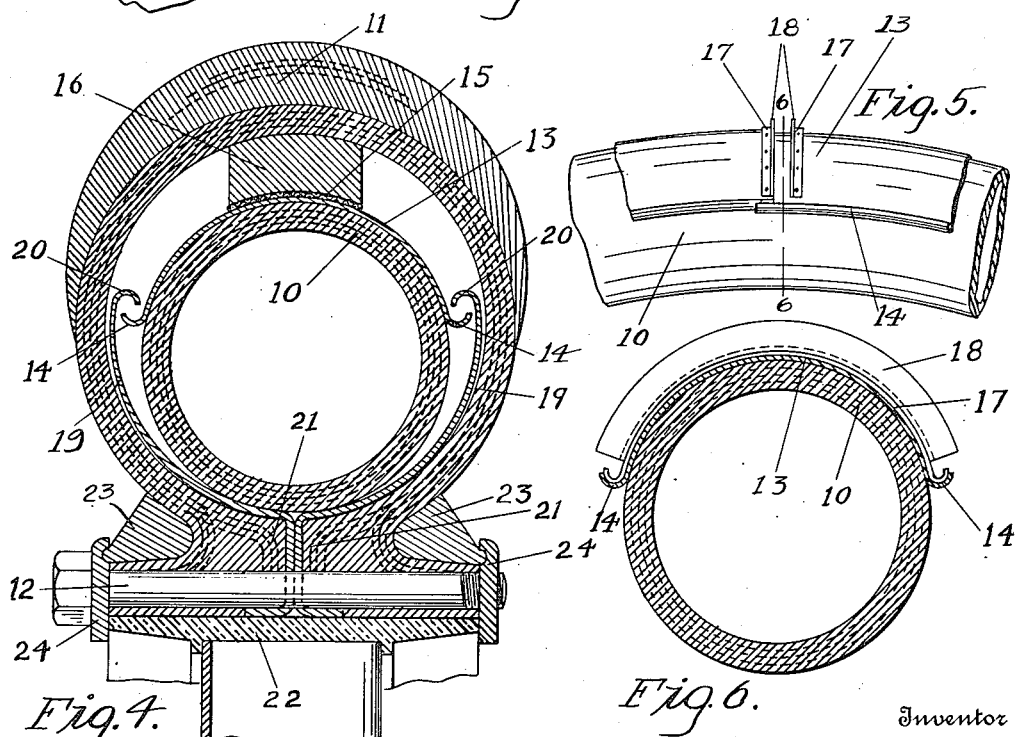

ANDREW WILLIAM LIVINGSTON, OF OAKLAND, CALIFORNIA, ASSIGNOR TO STANDARD STEEL WHEEL AND TIRE ARMOR COMPANY, OF OAKLAND, CALIFORNIA, A CORPORATION OF ARIZONA.

TIRE.

1,060,195.

Specification of Letters Patent.   Patented Apr. 29, 1913.

Application filed November 7, 1911.   Serial No. 658,993.

*To all whom it may concern:*

Be it known that I, ANDREW W. LIVINGSTON, a citizen of the United States, residing at Oakland, in the county of Alameda and State of California, have invented certain new and useful Improvements in Tires, of which the following is a specification.

This invention relates to tire protectors and the principal object of the same is to provide a protector which will fit between the inflating tube and the outer protecting casing of the tire so that the inflating tube will be protected from punctures.

It is also desired to produce a protector which may be readily removed from one tire to another so that when the outer casing is worn out the protector may be easily removed, and a new outer casing provided.

This invention is illustrated in the accompanying drawings, wherein:

Figure 1 is a view of a wheel provided with the improved protector shown partially in side elevation, and partially in section. Fig. 2 is a perspective view of a section of the outer member of the protector. Fig. 3 is a fragmentary sectional view through a tire provided with the protector. Fig. 4 is a transverse sectional view through a tire provided with a protector. Fig. 5 is a fragmentary side elevation of a tire showing the meeting ends of the metallic strip extending along the tread portion of the tire. Fig. 6 is a sectional view along the line 6—6 of Fig. 5.

Referring to the accompanying drawings by numerals it will be seen that this invention is used with a tire having the inner inflating tube 10 and the outer protecting casing 11 which is secured to the wheel rim by means of the bolt 12. A metallic band 13 incloses the tread portion of the inner tube 10 and is provided with rolled sides 14 the purpose of which will be hereinafter brought out. A fabric strip 15 is carried by the band 13 and carries a number of blocks 16 which support the tread portion of the outer casing 11 thus holding the casing in spaced relation to the inflating tube. The free ends of the band 13 are overlapped as shown in Fig. 5, and are each provided with a strip 17 having outstanding flanges 18. These flanges 18 limit the contraction of the band, thus permitting the band to accommodate itself to the size of the inner tube and to permit the inner tube to take up any jolts and jars due to going over rough roads. This gives the tire all the resiliency of a pneumatic tire while, at the same time the band protects the tread-portion of the inner tube from punctures. Side bands 19 are positioned in the casing and extend along the sides of the casing. The inner ends of the band 19 are rolled inwardly to form the flanges 20 which overhang the curved sides of the band 13, thus preventing nails or other objects from passing between the bands. It should be noted that these overhanging portions of the bands are in spaced relation thus preventing the bands from interfering with the free contraction and expansion of the tire. The bands 19 pass between the contacting edges 21 of the casing and extend for a short distance between the casing, and the rim 22. The bolts 12 pass through the bands 19 so that when the casing is clamped to the rim the bands 19 will be securely held against any movement. It will thus be seen that it is impossible for the bands 19 to work loose and by rubbing against the inner tube wear the same. Bands 23 are placed to each side of the casing and clamping plates 24 are secured to the sides of the rim and overlap the bands 23 so that the bolts 12 which hold the bands 19 in place may be used for holding the rings 24 also.

When using this device, the band 13 is placed in the casing and the inflated tube inserted. The side bands are then inserted with the flanges 20 overhanging the rolled sides 14. The bands 23 are then placed upon the tire and the plates 24 secured to the rim by means of the bolt 12. The tire will be held in place and the bands 19 prevented from movement. When it is desired to remove this protector, all that is necessary is to remove the tire from the rim, and withdraw the side bands 19 and the tread bands 13.

What is claimed is:—

A tire comprising an outer casing, an inner tubing, a metallic band surrounding the tread portion of said inner tubing and provided with outwardly curved side portions, the end portions of said band being overlapped and carrying ribs to limit the overlapping movement of the band, blocks mounted upon said band and holding the same in spaced relation to the tread portion of said casing, reinforcing strips for the side portions of said casing having their free ends curved inwardly and overhanging the outwardly curved side portions of said band, and means for holding said side strips in place and securing said casing to a wheel rim.

In testimony whereof I affix my signature in presence of two witnesses.

ANDREW WILLIAM LIVINGSTON.

Witnesses:
JOSEPH M. BENHAM,
F. P. SCHROEDER.